(12) United States Patent
Wang et al.

(10) Patent No.: US 8,389,909 B2
(45) Date of Patent: Mar. 5, 2013

(54) HEATING DEVICE HAVING ELECTRIC AND FUEL POWERED HEAT SOURCES

(75) Inventors: Wender Wang, Wilmington, MA (US); Stephen Shapiro, Arlington, MA (US)

(73) Assignee: The Schawbel Corporation, Bedford, MA (US)

( * ) Notice: Subject to any disclaimer, the term of this patent is extended or adjusted under 35 U.S.C. 154(b) by 978 days.

(21) Appl. No.: 12/434,271

(22) Filed: May 1, 2009

(65) Prior Publication Data
US 2010/0276416 A1  Nov. 4, 2010

(51) Int. Cl.
*H05B 3/02* (2006.01)
*A01G 13/06* (2006.01)

(52) U.S. Cl. .................. 219/546; 392/386

(58) Field of Classification Search .......... 219/538, 219/546, 541, 221; 392/386, 390, 391, 394, 392/395; 222/71, 146.1–146.5; 429/428–432, 429/96, 97, 121, 122
See application file for complete search history.

(56) References Cited

U.S. PATENT DOCUMENTS

| | | | | |
|---|---|---|---|---|
| 5,825,975 A | * | 10/1998 | Privas | 392/404 |
| 5,928,605 A | * | 7/1999 | Bonnema et al. | 422/5 |
| 7,288,748 B1 | * | 10/2007 | Thuot | 219/541 |
| 7,482,091 B2 | * | 1/2009 | Bourilkov et al. | 429/121 |
| 2007/0079889 A1 | * | 4/2007 | Lindsay et al. | 141/83 |

* cited by examiner

*Primary Examiner* — Sang Paik
(74) *Attorney, Agent, or Firm* — Levisohn Berger LLP

(57) ABSTRACT

A portable device which generates heat and which can be used alternatively as a corded, plug-in device or as a cordless, fuel-powered device. The device has dual heating capabilities—each of which is powered by a unique cartridge. For use as a plug-in device an electric cartridge that connects the device to an adapter is utilized, whereas for use as a portable device a fuel cartridge is utilized for supplying a hydrocarbon fuel to support combustion. Use of one of the cartridges prevents the use of the other.

15 Claims, 8 Drawing Sheets

HEATING DEVICE HAVING ELECTRIC AND FUEL POWERED HEAT SOURCES

FIELD OF THE INVENTION

The present invention relates generally to heating devices that are capable of utilizing either hydrocarbon combustion or electric current as a source of heat.

BACKGROUND OF THE INVENTION

There are many portable devices, such as blow dryers and curling irons that utilize heat in their operation. Portable devices that utilize heat to evaporate or volatilize substances are also well known in the prior art. Such devices are commonly used to dispense insect control active ingredients or air treatment materials, such as air fresheners. Users employ these devices in a variety of places, such as in their backyards, near swimming pools or patios and the like. They also are commonly toted as part of hunting or camping gear to be used in the wilderness—usually far from a source of electricity.

However, prior art devices are limited by the fact that a single source is utilized to generate heat—either fuel powered combustion or electrical power. Thus an electrically powered plug-in device would not be useful for camping/hunting—beyond the range of accessible electric current, and a fuel powered device would not be necessary when the device is used around the home with convenient access to electrical current. Thus, each of the prior art systems is adapted for a limited use.

The current invention solves this problem by providing a single device for volatilizing substances that is alternatively powered by either a hydrocarbon fuel source or by electrical current.

It is important for units to be lightweight and easily portable, and the prior art has focused on developing streamlined systems. Combining two heat sources and their corresponding two fuel sources would increase the size, weight and ultimately the utility of the unit. Moreover, if the two sources were utilized simultaneously it could result in temperature control problems and would possibly damage the unit. Thus, there is a need for a single, lightweight, portable device that produces heat and which can be alternatively powered by either electric current or by fuel combustion according to user's preferences and/or needs.

SUMMARY OF THE INVENTION

The current invention addresses these problems by providing a dispensing device that is powered by either of two cartridges—an electric cartridge or a fuel cartridge The cartridges are designed to be inserted into the same cavity which has attachment means to receive either one The cartridges cannot be inserted or utilized simultaneously, thus allowing for the device to be streamlined and lightweight while supporting dual heating capacities. Temperature control issues also are avoided.

The invention will be described as it relates to an insect repellant device, but one of ordinary skill in the art would recognize that the invention relates broadly to portable devices, which are designed to utilize alternative fuel sources.

The inventive device includes both a gas-fueled and an electric powered heat source by way of a tank connection means that is configured to alternatively receive either a fuel tank in gas-tight relation or an electric cartridge for connecting the device to a source of electricity. For use as a portable device, a fuel tank is inserted for providing fuel for combustion. However, for use as a plug-in device an electric cartridge is inserted which is connected to a power supply (adapter) to provide safe, low voltage power, thus allowing for the device to be plugged into a standard electrical outlet. For the purpose of this application, when the device is used in combination with an electric cartridge it is in "plug-in mode," whereas when it is used in combination with fuel cartridge it is said to be in "portable mode."

Regardless of the heat source—the manner in which volatilizable substances are dispensed is fundamentally the same. Namely, a conductive heat plate is provided—upon which a mat impregnated with a volatilizable substance is placed. When the heat plate is sufficiently heated—from either heat source—the volatilizable substances evaporate and are thereby dispensed.

In portable mode, a fuel cartridge is inserted into a tank connection assembly having a means for metering fuel from the cartridge to a combustion nozzle located within a combustion chamber. At the combustion nozzle a spark source is provided for igniting a fuel/air mixture for combustion.

In plug-in mode, instead of inserting a fuel cartridge, an electric cartridge (referred to interchangeably herein as an e-cartridge) is inserted. The e-cartridge is adapted to selectively engage with an electrical connector of the tank connection assembly. A line cord extending from the e-cartridge to a plug mounted, low voltage adapter, is used to plug the device into an electrical socket. The device comprises an electrical circuit having a heating element. Current flowing through the circuit causes the heating element to reach a temperature that provides enough heat to the heating plate in order to volatilize substances. If the heating element is a positive temperature coefficient resistor (PTCR) the element will control the heating plate temperature. If a simple resistance heater is used, the heat input must balance with the heat loss at the desired heating plate temperature. Alternatively, a thermostat may be provided to control the electrical power going to the heating element and so maintain the desired heating plate temperature Embodiments of the invention thus allow for a safe and easy to use device that is not limited by the need to be plugged into an electrical receptacle, being instead entirely portable for use at any location desired, and can also be plugged into an electric outlet for use without a fuel cartridge. Furthermore, because a unique cartridge is inserted for each use—the device need not carry any fuel while in plug-in mode and the external low voltage adapter is removed in portable mode. This allows for a single device, which permits a user to select a preferred method of dispensing substances that is streamlined and lightweight.

DETAILED DESCRIPTION OF THE INVENTION

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

Figure 1:
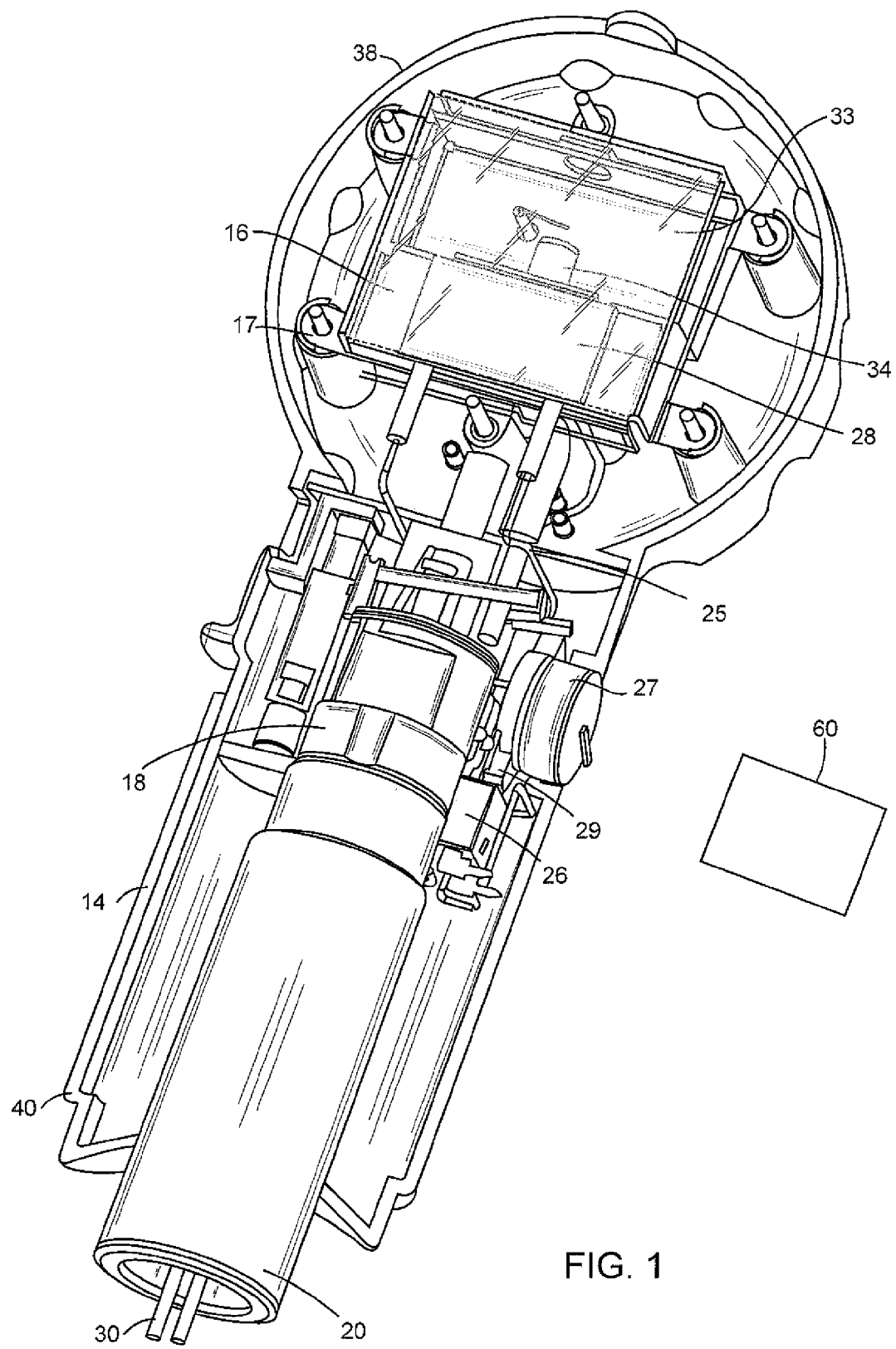
FIG. 1 is a top, perspective view of a dispensing unit shown with its top casing removed and with an e-cartridge secured therein.

Referring to FIG. 1, the mechanical elements of the dispensing device 10 are enclosed within a housing. The housing preferably comprises an upper casing (not shown) and a lower casing 14. In a preferred embodiment, the device comprises a dispensing end 38 and a handle 40. The dispensing end 38 contains the heat sources used for dispensing the volatilizable substances, and the handle 40 is barrel or rod shaped and easily fits in the grip of a user. In an embodiment handle 40 comprises a cavity that is sized and shaped to accommodate the fuel and electric cartridges—one at a time In this fashion, the use of the e-cartridge physically prevents the use of the fuel cartridge and vice versa.

Figure 4:
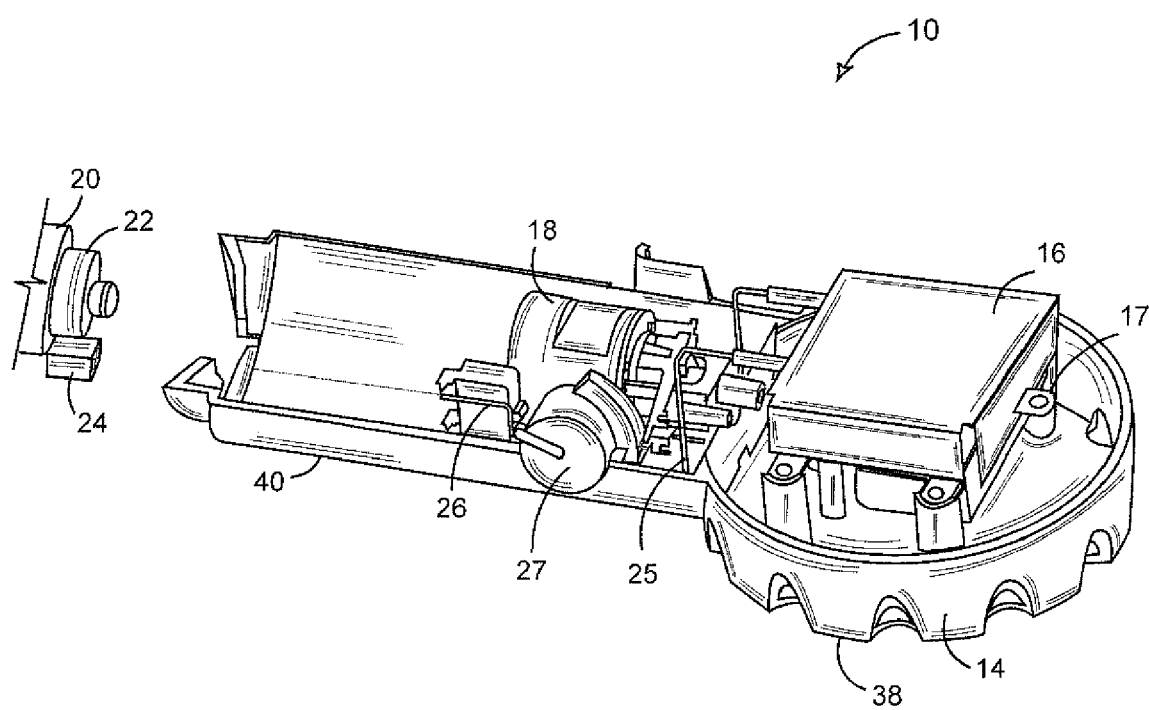
FIG. 4 is a top, perspective view of a dispensing unit shown with its top casing removed and with an e-cartridge prior to being inserted.

Dispensing end 38 houses a heating plate 16 comprising a thermally conductive material—such as aluminum, copper or the like—for receiving a mat 60 impregnated with a volatilizable substance. The heating plate 16 is secured atop of the heat sources and is in thermal communication therewith. As shown, tabs 17 extend from heating plate 16 that are adapted to receive a screw or similar fastening device for securing heating plate 16 to housing 14. Note that the heating plate in FIG. 1 is shown as being transparent in order to show the heating sources disposed therebelow. In FIG. 4 plate 16 is shown in solid and secured atop of the heat sources.

When either of the heat sources is activated, heat is transferred to the conductive plate. The conductive plate 16 reaches a sufficient temperature so as to dispense a volatilizable substance in thermal communication therewith.

Figure 2:
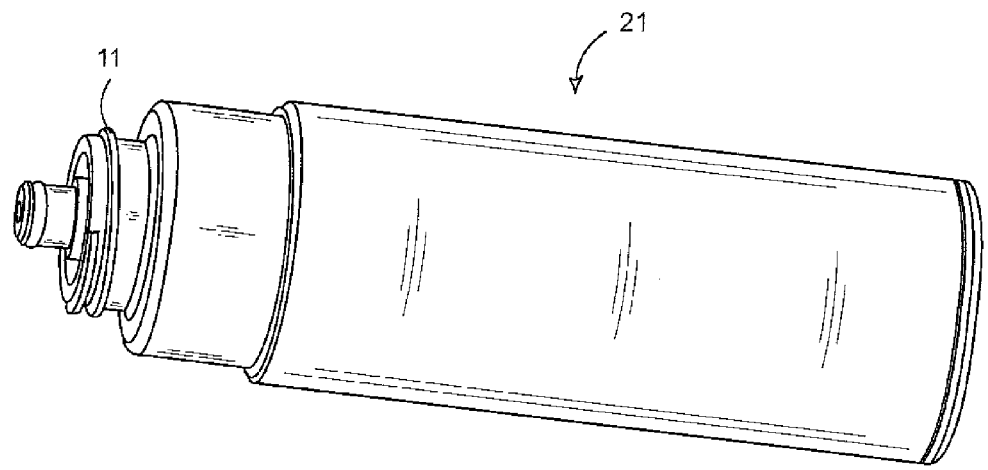
FIG. 2 is a side perspective view of a fuel cartridge according to an embodiment of the invention.
Figure 3:
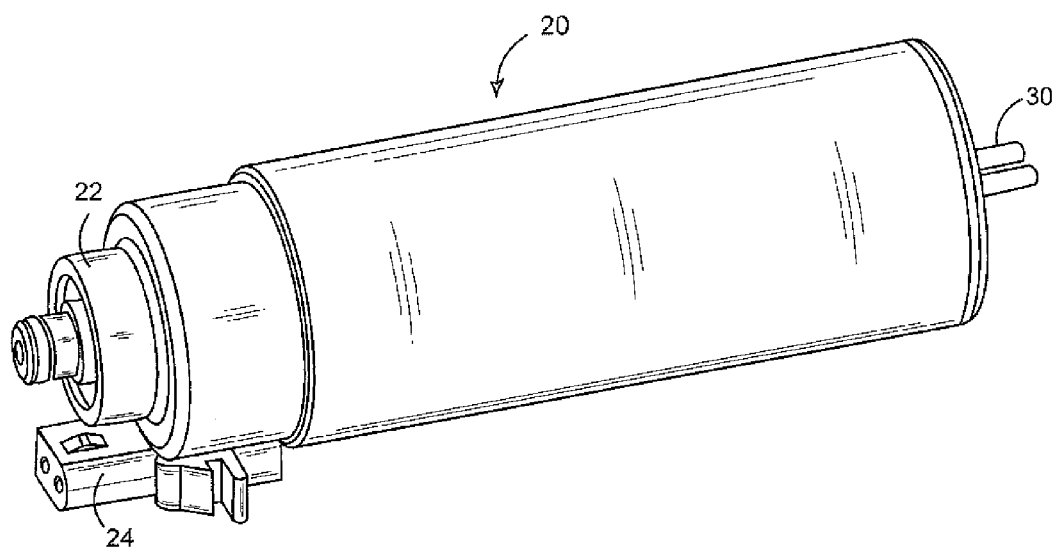
FIG. 3 is a side perspective view of an e-cartridge according to an embodiment of the invention.

In order to supply constant energy to the heat sources, a fuel cartridge or an electronic cartridge must be secured and positioned for dispensing either fuel or electric current To that end, a tank connection assembly 18 is disposed in the housing that is adapted to alternatively receive a fuel cartridge (shown in FIG. 2) or an electrical cartridge (shown in FIG. 3). Connection assembly 18 comprises a threaded attachment means for threadedly engaging corresponding threads 11 on fuel tank 21. Connection assembly 18 also is sized and shaped to receive e-cartridge 20. Electric cartridge 20 comprises an unthreaded engagement portion 22 that slides into the threaded receiving portion of connection assembly 18 in a frictional relationship.

Referring to FIG. 3, an electric cartridge 20 is shown, which connects to an AC/DC converter for converting current to be safe outdoors, and usable in the heating element. A line cord 30 extends from e-cartridge 20, which when inserted into an electric socket allows for current to flow into the AC/DC converter. Projecting from e-cartridge 20 is an electrical connector 24 for mating with corresponding conductive wires 25 in the device. When e-cartridge 20 is engaged with connection assembly 18 and electrical connector 24 is in electrical contact with the internal electric heating circuit via wires 25—current output from the e-cartridge 20 flows to the heating element. Electric cartridge 20, thus serves as a connector, which connects the internal wiring of the device to a power supply via electrical contact.

In an embodiment of the invention, the adapter/power supply could be housed inside the e-cartridge. In this embodiment, the power cord and connections between the wall receptacle and the e-cartridge must be weatherproof and water tight as they will carry dangerous current to the e-cartridge. It is therefore preferable for the adapter/power to be inserted in a wall plug.

In one preferred embodiment, and as best shown in FIG. 1, a switch 26 is inserted into the circuit. As such, the flow of electric current could be interrupted when the switch 26 is in the "off" position (i.e. the circuit is broken). In this embodiment, after inserting the e-cartridge 20 and plugging into an electrical outlet, the switch would need to be moved into the "on" position to complete the circuit and therefore allow current flow to the heating element. In one embodiment, a rotatable knob 27 having a projecting member 29 is provided to turn the switch on or off.

Referring to FIG. 1, electrical wires 25 are shown, which deliver current to heating element 28. Heating elements are known in the prior art and are commonly used in portable devices that require heat.

Although substantially any heating element or resistor may be used, in a preferred embodiment heating element 28 comprises PTCR material PTCR (positive temperature co-efficient of resistivity) materials are well known in the art as being suited for heating purposes. This is because as the heat of the material increases it becomes increasingly resistant to current and at high enough temperatures it ceases to conduct at all. As such, PTCR is an excellent self-regulating material that effectively shuts off a heat source when it becomes excessively hot, and begins conducting (and therefore heating) again after it cools down.

FIG. 4 is a broken away, partial perspective of some of the mechanical elements of the dispensing device. As shown, e-cartridge 20 is aligned with and positioned to be inserted into tank connection assembly 18. A line card 30 (not shown) extends from e-cartridge 20. A first end of line cord 30 comprises a low voltage transformer having prongs for inserting into an electrical socket and a second end of line cord 30 is inserted into an e-cartridge 30.

As previously described, the dispensing device can be alternatively used in "plug-in" or "portable mode." For use in portable mode, a fuel cartridge containing a hydrocarbon fuel is inserted into tank connection assembly 18. Tank connection assembly 18 comprises a threaded receiving area for threadedly engaging corresponding threads on the fuel cartridge. Bayonet, snap and other alternatives to threaded engagement will be apparent to one of ordinary skill in the art and are within the scope of the invention.

In portable mode, combustion supported by air and gas mixture is utilized to supply heat to the heating plate 16. In this embodiment, a hydrocarbon fuel source is utilized for dispensing volatilizable substances according to the teachings of U.S. Pat. No. 4,699,123, U.S. Pat. No. 4,759,343 and U.S. Pat. No. 4,815,441—each of which is incorporated by reference herein. Note that the incorporated patents describe a two-burner system, whereas in the current invention a single burner system is utilized as described in U.S. Pat. No. 5,700,430 and incorporated by reference herein in its entirety.

Figure 6:
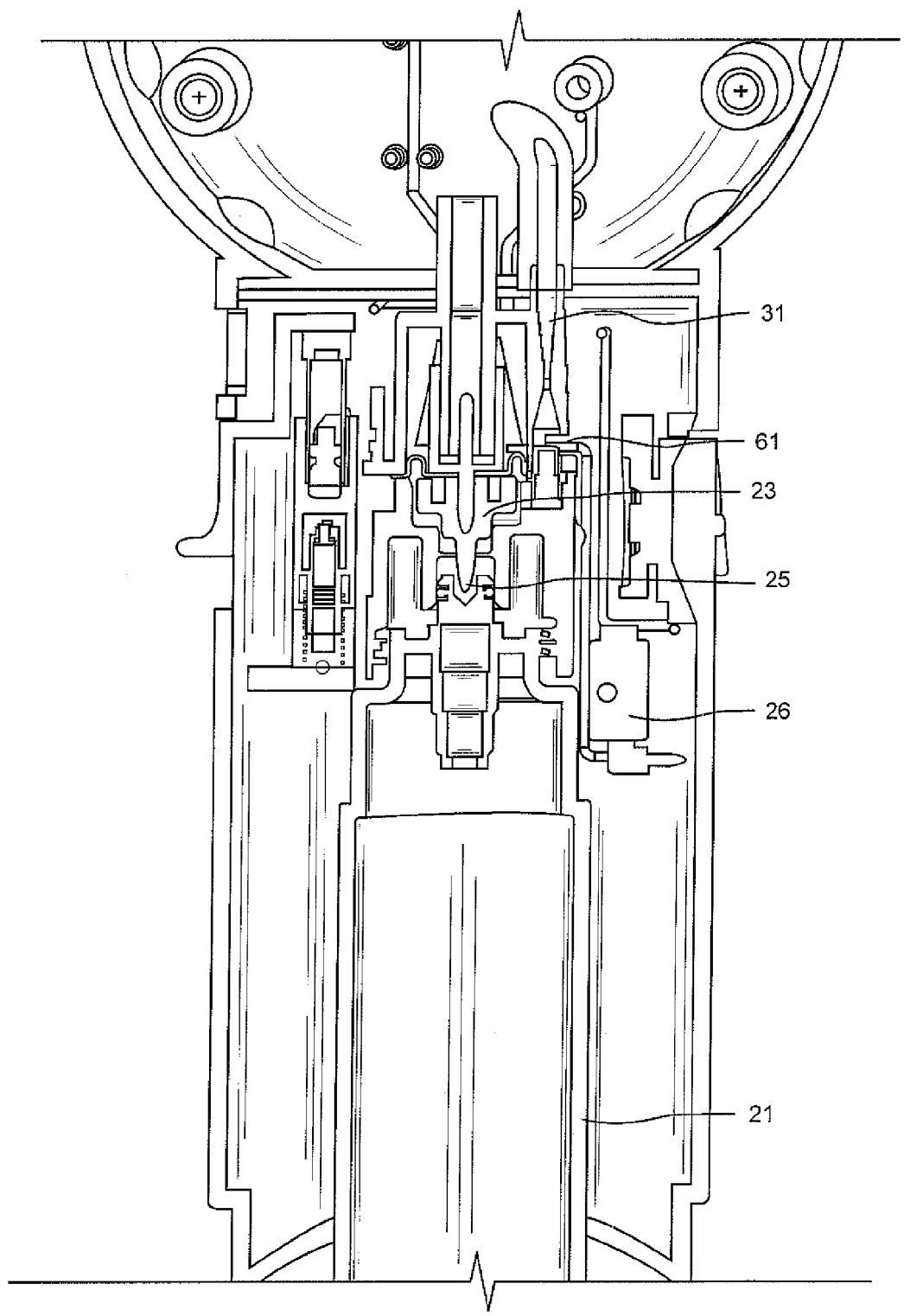
FIG. 6 is a cross-sectional partial top view of a dispensing unit with a fuel cartridge secured therein according to an embodiment of the invention.

FIG. 6 shows a cross-sectional view of a dispensing unit with a fuel cartridge 21 that is secured in connection assembly 18 and positioned to dispense gas. A fuel metering device or system is provided for metering gas. For example, a valve activator system is provided to control the release of gas from cartridge 21. In one preferred embodiment, and as shown in FIG. 6, the valve activator system comprises a plunger 23 having one pointed end 25 that is utilized to depress a fuel cartridge valve and a second end that is connected to a spring which exerts a biasing force thereupon. When cartridge 21 is inserted and secured in assembly 18, plunger 23 is pushed downward (toward the cartridge) by the attached biasing spring (not shown) thereby opening the cartridge valve and permitting gas to flow therefrom. Thereafter, pressure exerted from escaping gas builds up to apply a counter force to plunger 23. Eventually the pressure from escaping gas overcomes the pressure exerted by the spring, and the pressure build-up pushes the plunger off of the cartridge valve, thereby terminating supply. Once the gas pressure diminishes and there is no counter pressure on the spring—the plunger is forced into the valve once again to permit gas flow. This allows for an effective gas regulating system Fuel flowing from the fuel cartridge is delivered to a venturi tube 31, which has an opening 61 for the intake of air thus creating a fuel/air mixture. The fuel/air mixture is accelerated into a combustion nozzle 34 (as shown in FIG. 1). In one embodiment, a hydrocarbon fuel line 35 (best seen in FIGS. 7 and 8) carrying a fuel/air mixture passes below or around heating element 28 to reach the combustion chamber 33 located above it. It will be understood by one of skill in the art that the two heat sources may positioned in any of various configurations such as side by side or separated from one another. In other embodiments of the invention, two separate heating plates are provided—one disposed above, and in thermal communication with, the electric heating element 28 and the other above and in thermal communication with the combustion chamber 33.

Figure 7:
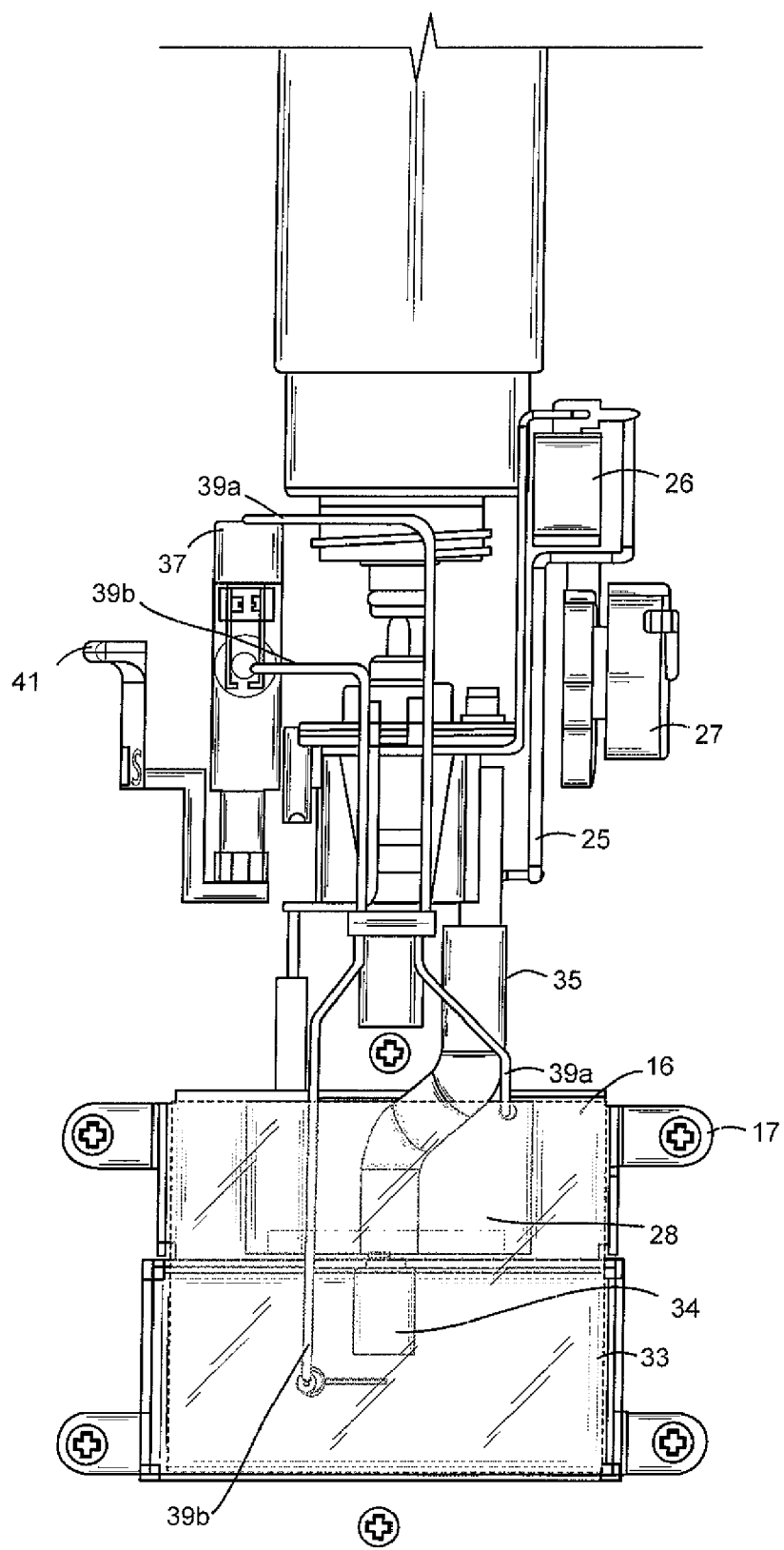
FIG. 7 is a broken away, bottom view of a dispensing unit showing an ignition circuit according to an embodiment of the invention.
Figure 8:
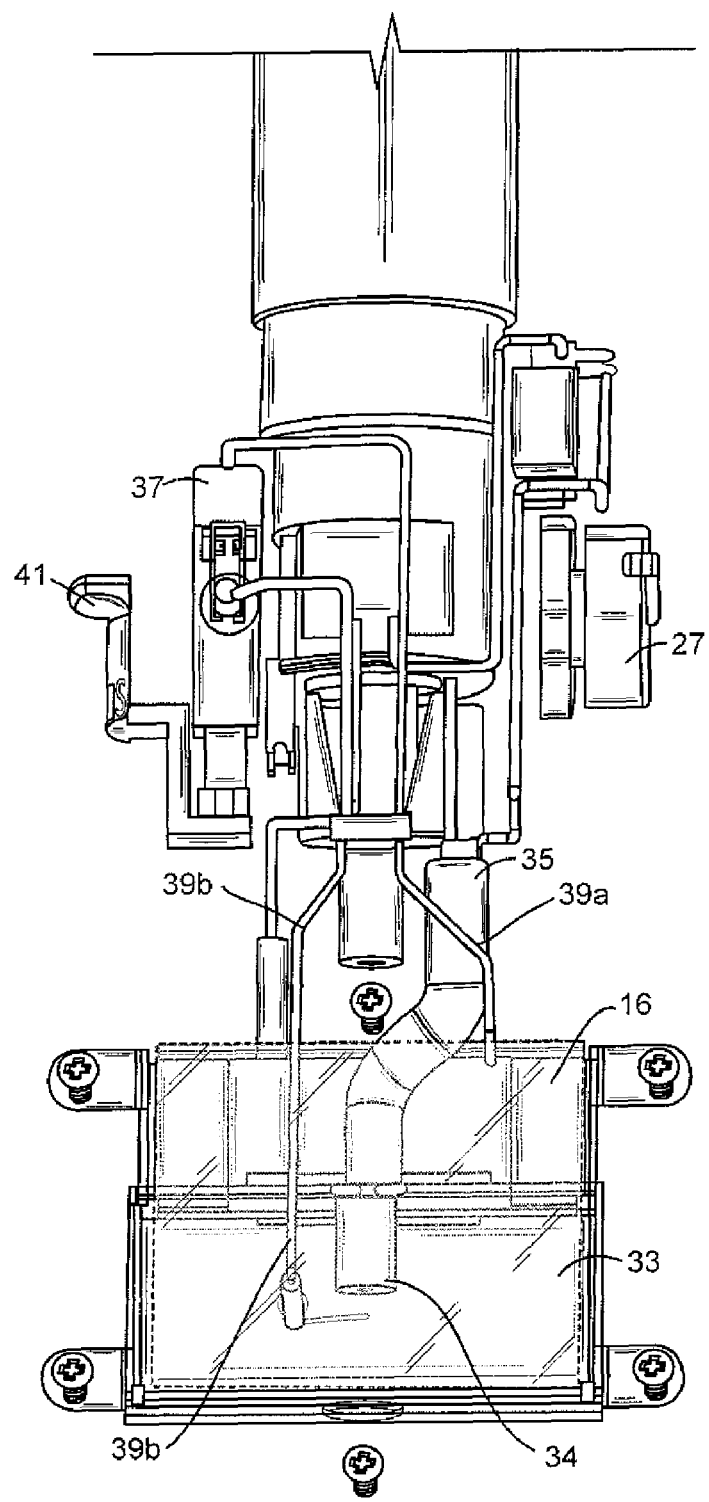
FIG. 8 is a broken away, bottom view of a dispensing unit showing an ignition circuit according to an embodiment of the invention.

Combustion chamber 33 comprises an ignition system for initiating hydrocarbon combustion. Referring to FIG. 7, a pair of electrode wires 39 is provided, which emanate from a piezoelectric device 37. One wire 39a has a first end, which emanates from piezoelectric device 37 and terminates in contact with heating plate 16. Another wire 39b emanating from piezoelectric device 37 terminates in close proximity to combustion nozzle 34. Combustion nozzle is in contact with heating plate 16 and is therefore in electrical contact with wire 39a. As such, there is provided an ignition circuit that is complete except for a gap between terminal end of wire 39b and combustion nozzle 34. When the piezoelectric device 37 is activated, a spark jumps from the terminal end of wire 39b to combustion nozzle 34, thereby completing the ignition circuit. In a preferred embodiment, piezoelectric device 37 is activated by an ignitor button 41, which when pressed by a user activates piezoelectric device 37.

The two different heat sources are each utilized to the exclusion of the other. In plug-in mode, heating element 28 is exclusively utilized as a heat source, whereas in portable mode, combustion nozzle 34 is exclusively utilized. Both heat sources are situated beneath heating plate 16 (FIG. 1) and supply heat to the same.

Thus, a separate cartridge is provided for each use, and a user must change cartridges (from fuel to e-cartridge and vice versa) when switching between plug-in and portable modes. Moreover, the device is adapted to receive only one cartridge at a time. This prevents a user from simultaneously using both heat sources—which would cause temperature control problems. This configuration additionally allows for the device to have the same dimensions as previous models—allowing it to remain lightweight and compact—yet with dual heating capacities. Furthermore, fuel cartridges that have been popularized for use with previous dispensing devices made by the instant assignee may be used in the current dual powered device.

Figure 5:
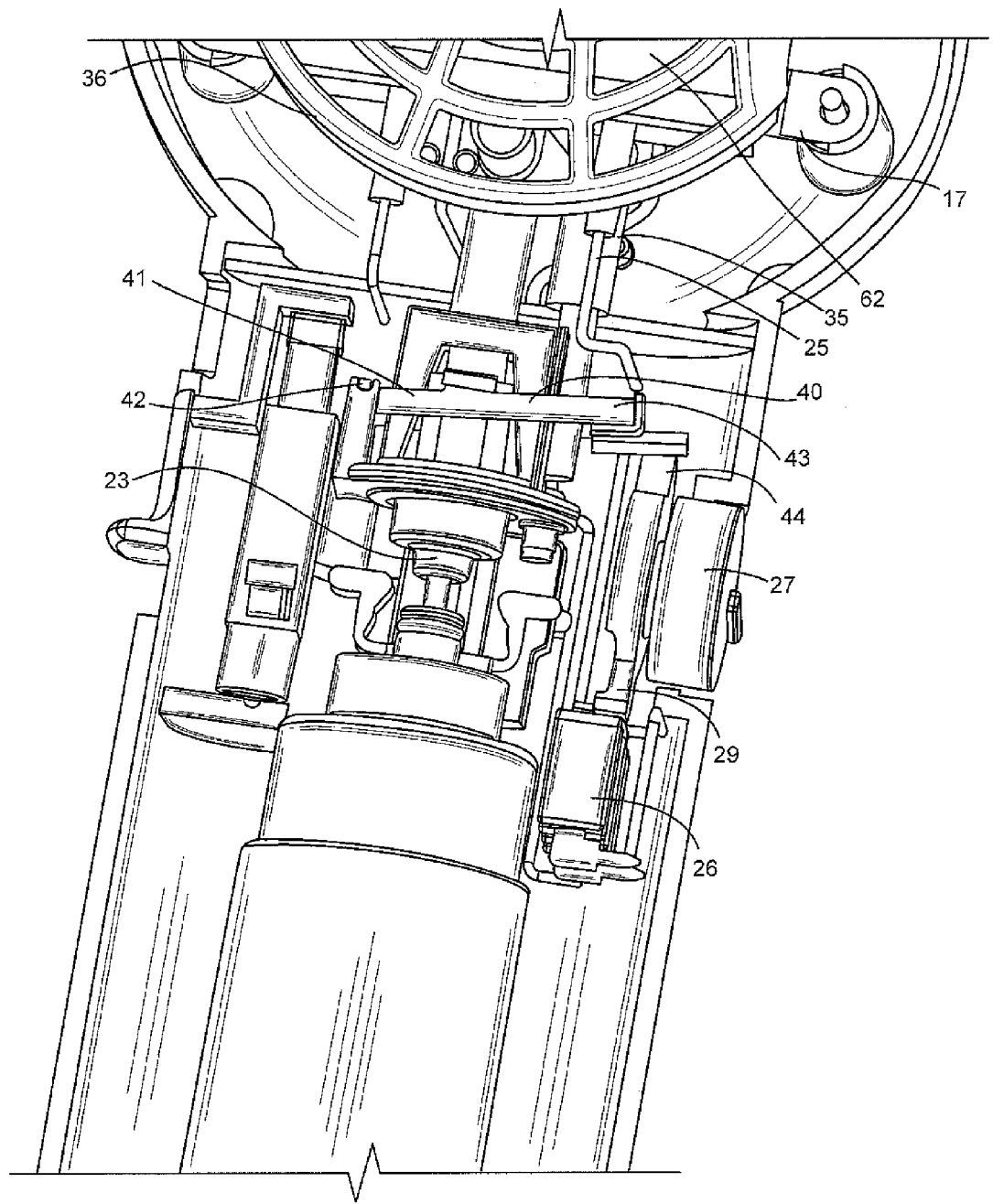
FIG. 5 is an enlarged partial top view of a dispensing unit shown without a top casing according to an embodiment of the invention.

In one embodiment of the invention, and as shown in FIG. 5, a switch mechanism is provided for enabling/disabling gas flow from cartridge 21, thereby serving as an "on" and "off" switch. As shown, a lever 40 is attached to plunger 23 substantially orthogonally thereto. A first end 41 of lever 40 is pivotably connected to the dispensing device, for example by way of pivot 42. In this configuration plunger 23 is not inhibited by pivoting lever 40 and it is therefore free to move toward and away from cartridge 21 as described above. However, lever 40 can be immobilized to suppress movement of plunger 23 and therefore prevent gas flow from cartridge 21. For example, as shown in FIG. 5, knob 27 is provided with a projecting arm 44, which terminates in close proximity to the second end 43 of level 40. Knob 27 is rotatable to position arm 44 in contact with lever 40 (clockwise in the illustration). Arm 44 thus presents as a physical barrier to the movement of lever 40 When lever 40 is thusly immobilized, attached plunger 23 also is immobilized and incapable of lowering toward cartridge 21 in older to depress the cartridge valve. This provides for an effective "off" switch when the device is used in portable mode.

Figure 9:
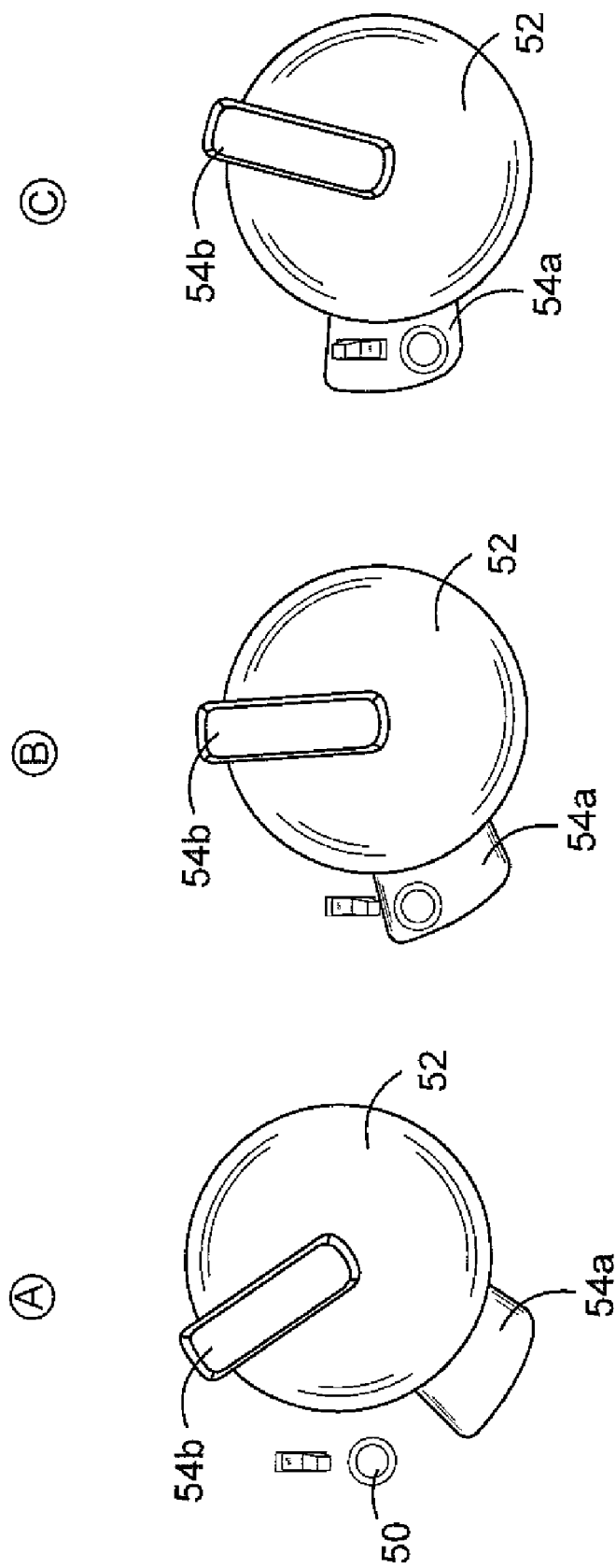
FIG. 9 is a schematic view of knob configurations that alternate between "plug in mode" and "portable mode" according to an embodiment of the invention.

In another embodiment of the invention, in plug-in mode, instead of using an e-cartridge as described herein, the device is adapted to receive a standard power cord as is well know in the art. In order to maintain safety and proper temperature control, the device is adapted to allow only one heat source to be used at a time For example, referring to FIG. 9, a power jack 50 is provided for receiving a power cord and is positioned near a switch knob 52. Flanges 54a, 54b on switch knob 52 prevents switch knob 52 from rotating to the gas "on" position when the power jack is in place. As shown in FIG. 9 (position A) an opening defined by flanges 54a and 54b allows for the insertion of a power cord into power jack 50. When the power cord is so inserted, it presents a physical barrier to flange 54a and 54b and does not allow any significant movement of switch knob 52. This prevents knob 52 from rotating to the gas "on" position when the power cord is in place. Similarly, the flanges 54 prevent the insertion of a power jack when the switch is in the gas on position (position C). As shown, when knob 52 is rotated to the gas "on" position, one of the flanges (54a in the illustration) covers power jack 50, thereby preventing the insertion of a power cord when the gas function is "on."

Referring to FIG. 5, a grill 36 is shown disposed above the heat sources 28, 34. In use, a mat 60 is inserted in the underside of grill 36 the mat thus being in thermal contact with the heating plate 16 therebelow and protected by the grill 36 thereabove. Grill 36 comprises slots 62, which allows for volatilized substances to escape.

Having described this invention with regard to specific embodiments, it is to be understood that the description is not meant as a limitation since further modifications and variations may be apparent or may suggest themselves to those skilled in the art. It is intended that the present application cover all such modifications and variation as fall within the scope of the appended claims. For example, it will be understood by those of ordinary skill in the art that the dual power sources taught in by the current invention can be applied to other devices such as curling irons, blow dryers, power tools and the like as well as to other heating devices.

What is claimed is:

1. An apparatus for generating heat comprising:
a housing;
at least two heat sources disposed in said housing, said heat sources comprising an electric heating element and a combustion chamber for supporting hydrocarbon combustion, said heating element being powered by electric current, said combustion chamber comprising a combustion nozzle for supporting combustion of a hydrocarbon fuel; and a cartridge connection assembly being adapted to selectively receive a fuel cartridge or an electric cartridge, said fuel cartridge comprising a connector for delivering electric current to power said heating element, wherein said cartridge connection assembly is sized to hold only one of said fuel cartridge or electric cartridge at a time, whereby both said fuel cartridge and said electric cartridge are prevented from simultaneously being held in said apparatus.

2. The apparatus of claim 1, further comprising an electric circuit, said circuit comprising direct current flowing from said electric cartridge to said heating element.

3. The apparatus of claim 2, further comprising a switch for interrupting flow of electric current in said circuit.

4. The apparatus of claim 1, wherein said heating element comprises PTCR material.

5. The apparatus of claim 1, further comprising a fuel-metering device.

6. The apparatus of claim 1, wherein said housing comprises a dispensing end and a handle.

7. The apparatus of claim 6, wherein said handle comprises a cavity, said cavity adapted to receive either said electric cartridge and said fuel cartridge.

8. An apparatus for generating heat comprising:
a housing;
at least two heat sources disposed in said housing said heat sources comprising an electric heating element and a combustion chamber for supporting hydrocarbon combustion, said heating element being powered by electric current, said combustion chamber comprising a combustion nozzle for supporting combustion of a hydrocarbon fuel; and a cartridge connection assembly being adapted to receive a fuel cartridge said fuel cartridge comprising a hydrocarbon fuel for said combustion, said device adapted to receive a power cord for supplying power to said heating element, wherein said device is sized to hold only one of said fuel cartridge or electric cartridge at a time, whereby both said fuel cartridge and said electric cartridge are prevented from simultaneously being held in said apparatus.

9. An apparatus for generating heat comprising:
a housing;
a thermally conductive heating plate for receiving a mat impregnated with a volatilizable substance disposed in said housing;
said heating plate disposed above two separate heat sources, said heat sources comprising an electric heating element and a combustion chamber for supporting hydrocarbon combustion, said heating element being powered by electric current, said combustion chamber comprising a combustion nozzle for supporting combustion of a hydrocarbon fuel; and a tank connection assembly being adapted to selectively receive a fuel cartridge or an electric cartridge, said fuel cartridge comprising a hydrocarbon fuel for said combustion, said electric cartridge comprising a connector to deliver electric current to power said heating element, wherein said housing is configured to receive only one of said cartridges at a time.

10. The apparatus of claim 9, further comprising an electric circuit, said circuit comprising current flowing from said connector to said heating element.

11. The apparatus of claim 9, further comprising a switch for interrupting flow of electric current in said circuit.

12. The apparatus of claim 9, wherein said heating element comprises PTCR material.

13. The apparatus of claim 9, further comprising a fuel-metering device.

14. The apparatus of claim 9, wherein said handle comprises a dispensing end and a handle.

15. The apparatus of claim 9, wherein said handle comprises a cavity, said cavity adapted to alternatively receive said electric cartridge and said fuel cartridge.

* * * * *